United States Patent
Burkhardt et al.

(10) Patent No.: US 7,716,476 B2
(45) Date of Patent: May 11, 2010

(54) SELECTIVELY AUTHORIZING SOFTWARE FUNCTIONALITY AFTER INSTALLATION OF THE SOFTWARE

(75) Inventors: Ryan Burkhardt, Redmond, WA (US); Raj Jhanwar, Bothell, WA (US); Vijayachandran Jayaseelan, Bellevue, WA (US); Jason Cohen, Seatac, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/338,583

(22) Filed: Dec. 18, 2008

(65) Prior Publication Data

US 2009/0106818 A1 Apr. 23, 2009

Related U.S. Application Data

(62) Division of application No. 10/653,041, filed on Aug. 29, 2003, now Pat. No. 7,472,286.

(51) Int. Cl.
*G06F 21/00* (2006.01)
*H04L 29/06* (2006.01)

(52) U.S. Cl. .............. 713/167; 705/59; 726/28

(58) Field of Classification Search .......... 726/26, 726/27, 28, 1; 705/50, 51, 59; 713/167, 713/193
See application file for complete search history.

(56) References Cited

U.S. PATENT DOCUMENTS

| | | | |
|---|---|---|---|
| 5,260,999 A * | 11/1993 | Wyman | 705/59 |
| 5,311,591 A * | 5/1994 | Fischer | 713/156 |
| 5,673,315 A | 9/1997 | Wolf | |
| 5,940,504 A | 8/1999 | Griswold | |
| 6,021,438 A | 2/2000 | Duvvoori et al. | |
| 6,110,228 A | 8/2000 | Albright et al. | |
| 6,188,995 B1 * | 2/2001 | Garst et al. | 705/59 |
| 6,233,576 B1 | 5/2001 | Lewis | |
| 6,286,138 B1 | 9/2001 | Purcell | |
| 6,327,652 B1 | 12/2001 | England et al. | |
| 6,330,670 B1 | 12/2001 | England et al. | |
| 6,367,072 B1 | 4/2002 | Justice et al. | |
| 6,499,035 B1 | 12/2002 | Sobeski | |

(Continued)

FOREIGN PATENT DOCUMENTS

CA 2299850 A1 9/2001

(Continued)

OTHER PUBLICATIONS

Swift, Michael M. et al., Improving the Granularity of Access Control for Windows 2000, ACM Transactions on Information and System Security, vol. 5, No. 4, Nov. 2002, pp. 398-437.

*Primary Examiner*—Gilberto Barron, Jr.
*Assistant Examiner*—Hadi Armouche
(74) *Attorney, Agent, or Firm*—Senniger Powers LLP

(57) ABSTRACT

Controlling access to functionality within an installed software product. The invention includes an authorization module that dynamically references authorization information when specific functionality is requested by a requesting entity such as a user or an application program to determine if the requested functionality is authorized to be executed. Further, the invention dynamically provides an opportunity to the requesting entity to purchase unauthorized functionality. In this manner, functionality within the software product may be enabled or disabled at any time (e.g., during installation, post-installation, and re-installation).

20 Claims, 6 Drawing Sheets

U.S. PATENT DOCUMENTS

| | | |
|---|---|---|
| 6,557,105 B1 * | 4/2003 | Tardo et al. .................. 713/193 |
| 6,859,880 B2 | 2/2005 | Johnson et al. |
| 6,920,567 B1 | 7/2005 | Doherty et al. |
| 7,346,585 B1 * | 3/2008 | Alabraba et al. .............. 705/59 |
| 2001/0029605 A1 | 10/2001 | Forbes et al. |
| 2001/0044782 A1 | 11/2001 | Hughes et al. |
| 2002/0045441 A1 | 4/2002 | Ralston et al. |
| 2002/0120726 A1 | 8/2002 | Padole et al. |
| 2002/0156877 A1 | 10/2002 | Lu et al. |
| 2002/0174356 A1 | 11/2002 | Padole et al. |
| 2003/0028798 A1 | 2/2003 | Burnett |
| 2003/0140243 A1 | 7/2003 | Nusser et al. |

FOREIGN PATENT DOCUMENTS

| | | |
|---|---|---|
| JP | 10003382 | 6/1998 |
| JP | 2001356912 | 12/2001 |

* cited by examiner

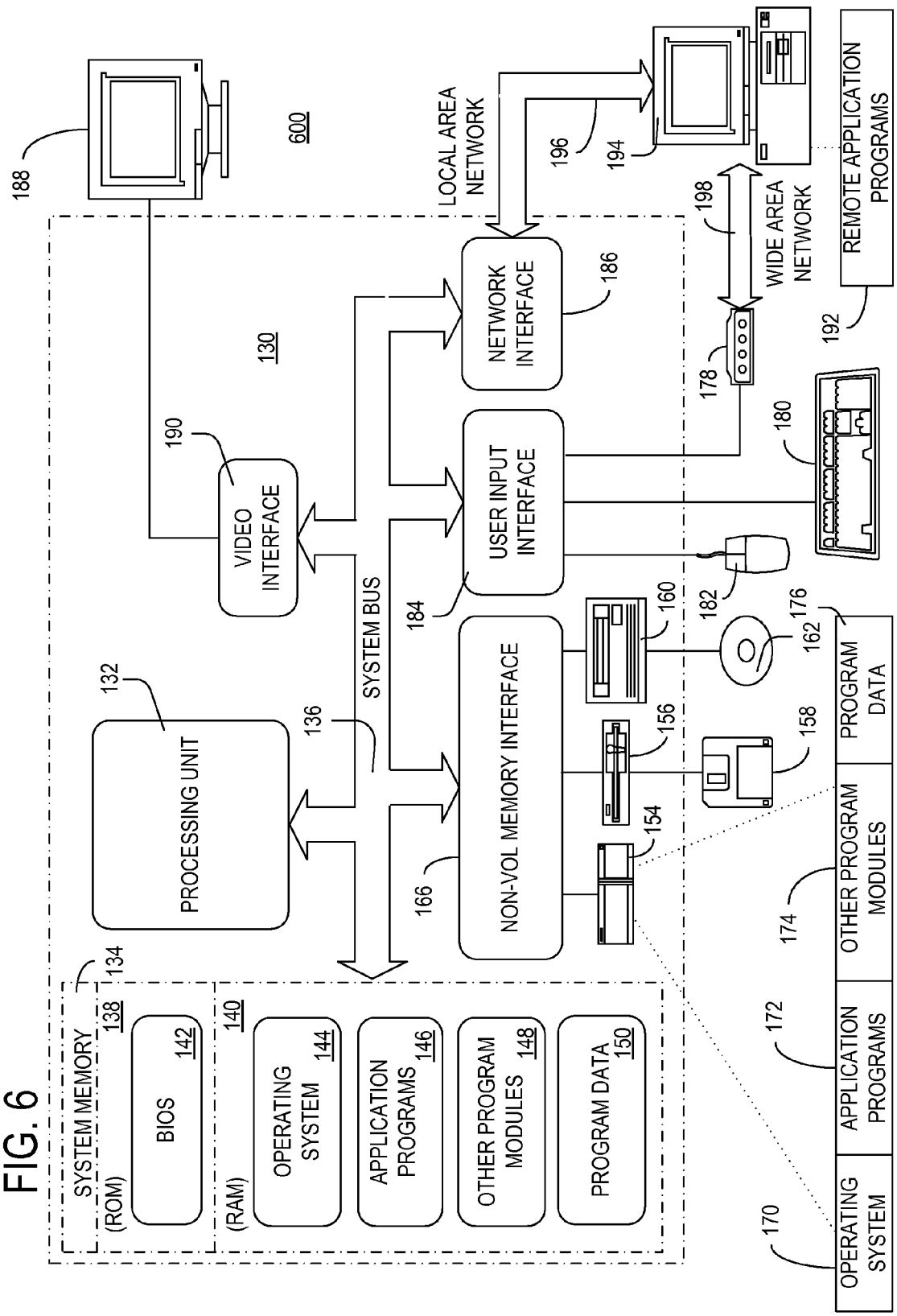

SELECTIVELY AUTHORIZING SOFTWARE FUNCTIONALITY AFTER INSTALLATION OF THE SOFTWARE

TECHNICAL FIELD

Embodiments of the present invention relate to the field of software products. In particular, embodiments of this invention relate to selectively providing functionality in a software product based on authorization after installation of the software product.

BACKGROUND OF THE INVENTION

Some existing systems provide access to data via an access control list (ACL) associated with each file or directory. Typically, access control rights for a particular directory are inherited by any descendent directories or files unless expressly overwritten by an access control list at the descendent directory or file. The request for access to data is processed based on the access control permissions corresponding to the target file or directory. However, such existing systems only provide access control at the granularity of a file or directory and fail to explicitly provide access control for functionality within executable software components.

Similarly, existing operating systems lack a simple model to control access to functionality in binary files when the binary files are present in the operating system. For example, if the functionality to perform a particular task exists in a library and the library is available to the operating system (e.g., on the local hard drive), the operating system will perform the task on request. With the advent of low cost, easily accessible broadband networking, computer users interested in pirating operating systems have easy access to the binary files needed to pirate the operating system. As such, separate versions of the operating system with differing functionality are created and distributed to limit the functionality available to the end user. For example, some systems provide multiple versions of a software product on an installation disk. During installation, the user enters a license key that installs the version associated with the entered license key. However, there is a need for a single version of a software product (e.g., a single set of binary files) that dynamically provides a subset of its functionality when executed to the user based on authorization (e.g., a license) associated with the user and with the software product. That is, existing operating systems fail to provide an authorization process for utilizing resources available within the operating system.

Accordingly, an authorization module that dynamically controls run-time access to functionality within a software product is desired to address one or more of these and other disadvantages.

SUMMARY OF THE INVENTION

Embodiments of the invention include an authorization module (e.g., a licensing component) enabling functionality within a software product having one or more components after installation of the software product on a computing device. In an embodiment, the invention includes a method for controlling access to functionality within an operating system. That is, the invention manages operating system resources utilizing authorization rules. The invention maintains resource rules (e.g., licensing information such as a set of licensing rules) specifying the binary files and functionality therein authorized for installation and execution on the computing device. The authorization module of the invention dynamically references the licensing information when specific functionality is requested by a requesting entity such as a user or an application program executing on the computing device to determine if the requested functionality is authorized. The invention dynamically provides an opportunity to the requesting entity to purchase unauthorized functionality. In this manner, functionality may be enabled or disabled at any time (e.g., during installation, post-installation, and re-installation). Further, the invention enables delivery of upgraded functionality to the user along with the reduced functionality version of a software product while preventing unauthorized access to the upgraded functionality via the authorization module. The invention also stores a definition for the software product that lists all features of the software product and their status (e.g., enabled or disabled).

In accordance with one aspect of the invention, a method enables functionality within a software product having at least one component after installation of the software product on a computing device of a user. The method includes receiving authorization information associated with the software product. The software product executes in accordance with the received authorization information. The method also includes receiving a request for functionality associated with the component during execution of the software product. The method also includes determining access rights for the requested functionality based on the received authorization information. The method further includes providing the requested functionality in accordance with the determined access rights.

In accordance with another aspect of the invention, one or more computer-readable media have computer-executable modules for enabling functionality within a software product after installation of the software product on a computing device of a user. The software product has at least one component. The modules include an interface module and an authorization module. The interface module receives authorization information associated with the software product. The software product executes in accordance with the received authorization information. The authorization module receives a request for functionality associated with the component during execution of the software product. The authorization module further determines access rights for the requested functionality based on the authorization information received via the interface module. The authorization module further provides the requested functionality in accordance with the determined access rights.

In accordance with still another aspect of the invention, a method dynamically provides a purchase opportunity to a user to enable functionality within a software product installed on a computing device of a user. The software product has at least one component. The method includes receiving authorization information associated with the software product. The software product executes in accordance with the received authorization information. The method also includes receiving a request for functionality associated with the component during execution of the software product. The method also includes determining access rights for the requested functionality based on the received authorization information. If the determined access rights deny access to the requested functionality, the method also includes providing a purchase offer to the user. Acceptance of the provided purchase offer enables the requested functionality.

In accordance with yet another aspect of the invention, a computer-readable medium stores at least two data structures each representing an authorization rule. The authorization rule provides access to functionality within a software product after installation of the software product on a computing device. The computer-readable medium includes a first authorization rule providing access to first functionality within the software product. The medium also includes a second authorization rule providing access to second functionality within the software product. The second functionality differs from the first functionality.

In accordance with still another aspect of the invention, an operating system has computer-executable modules including an authorization module and an upgrade module. The operating system includes authorization information associated with a software product. The software product is installed on a computing device and executes in accordance with the authorization information. The authorization module receives a request for functionality associated with the software product during execution of the software product. The authorization module further determines access rights for the requested functionality based on the authorization information. The authorization module further provides the requested functionality in accordance with the determined access rights. The upgrade module provides a purchase offer to the user to enable the requested functionality if the access rights determined by the authorization module deny access to the requested functionality. The upgrade module further receives an acceptance of the purchase offer from the user. The authorization module provides the requested functionality responsive to the acceptance received by the upgrade module.

Alternatively, the invention may comprise various other methods and apparatuses.

Other features will be in part apparent and in part pointed out hereinafter.

BRIEF DESCRIPTION OF THE DRAWINGS

FIG. 6 is a block diagram illustrating one example of a suitable computing system environment in which the invention may be implemented.

Corresponding reference characters indicate corresponding parts throughout the drawings.

DETAILED DESCRIPTION OF THE INVENTION

In an embodiment, the invention includes an authorization module such as a licensing component for enabling functionality within a software product during and after installation of the software product on a computing device. The functionality within the software product may be provided by various components or other subparts of the software product. In one example, the software product is componentized as next described.

Componentized Software Product

Figure 1:
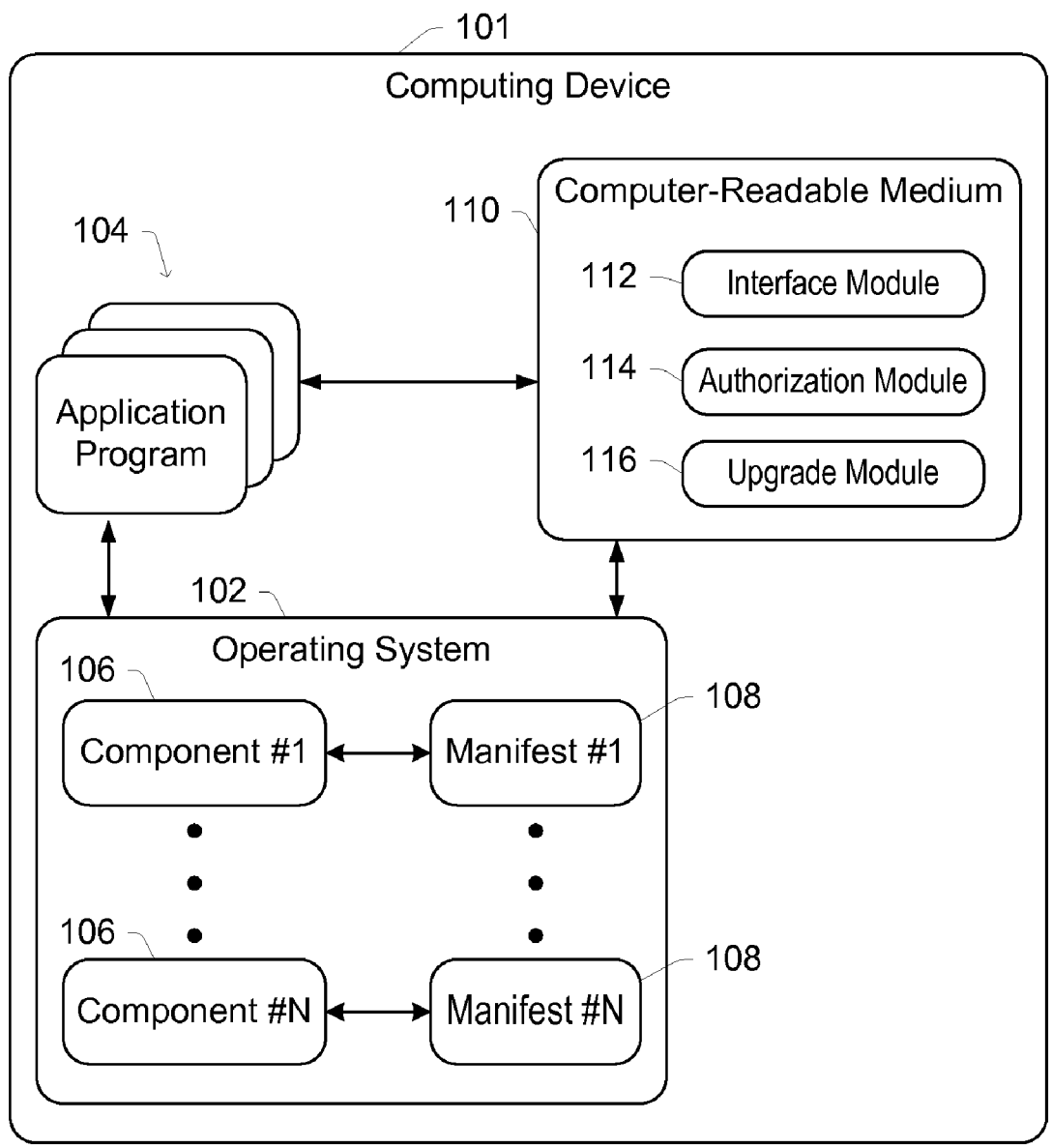
FIG. 1 is an exemplary block diagram illustrating a computing device having a componentized operating system.

Referring first to FIG. 1, a block diagram illustrates an exemplary computing device 101 in accordance with certain embodiments of the invention. The computing device 101 is illustrated as having a software product such as operating system 102 and one or more application programs 104.

Operating system 102 is the fundamental software control program for computing device 101, performing various functions including providing a user interface, managing the execution of one or more applications 104, and controlling the input of data from and output of data to various input/output (I/O) devices. Application programs 104 represent one or more of a wide variety of software application programs that may be executed on computing device 101. Examples of such application programs 104 include educational programs, reference programs, productivity programs (e.g., word processors, spreadsheets, and databases), recreational programs, utility programs (e.g., communications programs), etc. Application programs 104 may be installed on computing device 101 by the user, or alternatively pre-installed by the manufacturer and/or distributor of computing device 101.

Operating system 102 separates its functionality into multiple components 106 such as component #1 through component #N. Each component 106 has a corresponding manifest 108 such as manifest #1 through manifest #N, respectively. The components 106 include a collection of one or more files (or file identifiers). The files may include software instructions such as an executable file, a dynamic-link library (DLL), or a component object module (COM). The files may also include data for use by one or more of the components 106. In one implementation, the files (e.g., data and/or instructions) corresponding to particular functionality of the operating system 102 are grouped together in the same component 106. For example, there may be a games component, a communications component, and a file system component. The grouping of files that result in the componentization may be static or alternatively may change over time. In one example, updates to operating system 102 may result in selected files from certain components 106 being removed and added to other components 106.

Each manifest 108 includes information describing the corresponding component 106. Any of a wide variety of metadata regarding the corresponding component 106 may be included in each manifest 108. In one implementation, the manifest 108 identifies the version of the corresponding component 106 as well as which other components 106, if any, the corresponding component 106 is dependent on. By way of example, in order for one or more files in component 106 to properly execute, one or more other files (e.g., a DLL file) from another component may need to be installed on computing device 101. In this example, manifest 108 would indicate that component 106 depends on the other component.

Those skilled in the art will appreciate that the invention is not limited to a componentized software product as described herein, but is operable with other software product designs (e.g., non-componentized).

In one form, computing device 101 has one or more computer-readable media such as computer-readable medium 110 associated therewith. Medium 110 has computer-executable modules for enabling functionality within the software product after installation of the software product on computing device 101. In a componentized embodiment, the software product includes at least two components such as dynamic-link libraries where a second component represents a different version of a first component. For example, the second component represents an upgraded version of the first component. The software product comprises an operating system and/or an application program that is fully installed on computing device 101.

The computer-executable modules include an interface module 112, an authorization module 114, and an upgrade module 116. The interface module 112 receives authorization information (e.g., licensing information) associated with the software product. The software product executes in accordance with the received authorization information. The authorization module 114 receives a request for functionality associated with the component during execution of the software product. The authorization module 114 further determines access rights for the requested functionality based on the authorization information received via the interface module 112. The access rights represent granted or authorized user rights. The authorization module 114 further provides the requested functionality in accordance with the determined access rights. The upgrade module 116 provides a purchase offer to the user to enable the requested functionality if the access rights determined by the authorization module 114 deny access to the requested functionality. The upgrade module 116 further receives an acceptance of the purchase offer from the user while the authorization module 114 provides the requested functionality responsive to the acceptance received by the upgrade module 116.

In another embodiment, the operating system 102 includes one or more of the interface module 112, the authorization module 114, and the upgrade module 116. Operating system 102 also has access to the authorization information.

Installation with the Licensing Component

Figure 2:
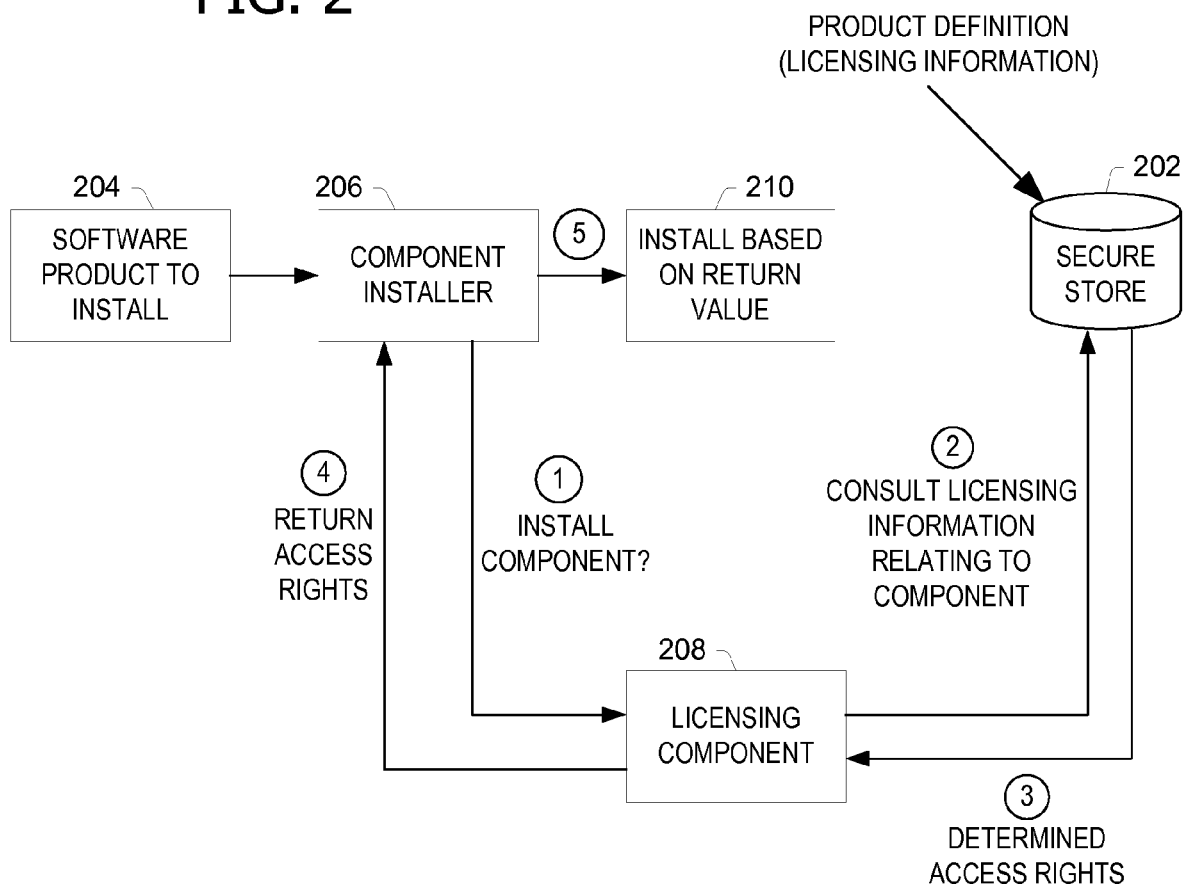
FIG. 2 is an exemplary block diagram illustrating installation of software components responsive to an authorization module.

The invention also operates to authorize installation of the components of the software product. Referring next to FIG. 2, an exemplary block diagram illustrates installation of software components responsive to a licensing component. One embodiment includes the sequence of operations indicated by the circled numbers in FIG. 2. The user, system administrator, or other entity creates authorization information (e.g., a product definition) for each version of the software product. The product definition includes licensing rules, license keys, or other licensing data identifying functionality or features within the software product. An exemplary product definition is shown below.

```
<APPLICATION PROGRAM A>
    ALL
<TCPIP>
    ALL
<WEB SERVER>
    NO
<TERMINAL SERVICES>
    CONNECTIONS = 1
```

In the above product definition, application program A and TCP/IP services are available to all processes and to the user. In contrast, the web server application program is not available. Terminal services functionality is available for only one connection.

During installation or upgrading of the software product, the invention receives (e.g., via a network) and stores the product definition in memory (e.g., in a secure store 202) accessible to the licensing component and installs or pre-installs (e.g., makes available for subsequent installation) the licensed components in the software product 204 by referencing the stored product definition. In particular, a component installer 206 communicates with the licensing component 208 (e.g., via an application programming interface function call) to determine if a particular component of the software product 204 is authorized for installation. The component installer 206 consults the product definition stored in the secure store 202 relating to the particular component. The product definition indicates the access rights (e.g., a specific numeric value) associated with the particular component. The licensing component 208 communicates the access rights for the particular component to the component installer 206. The component installer 206 proceeds to install the component in accordance with the access rights for the component at 210. In this manner, the licensing component 208 effectively blocks installation of components that are not authorized per the stored product definition.

Intercepting Function Calls after Installation

Figure 3:
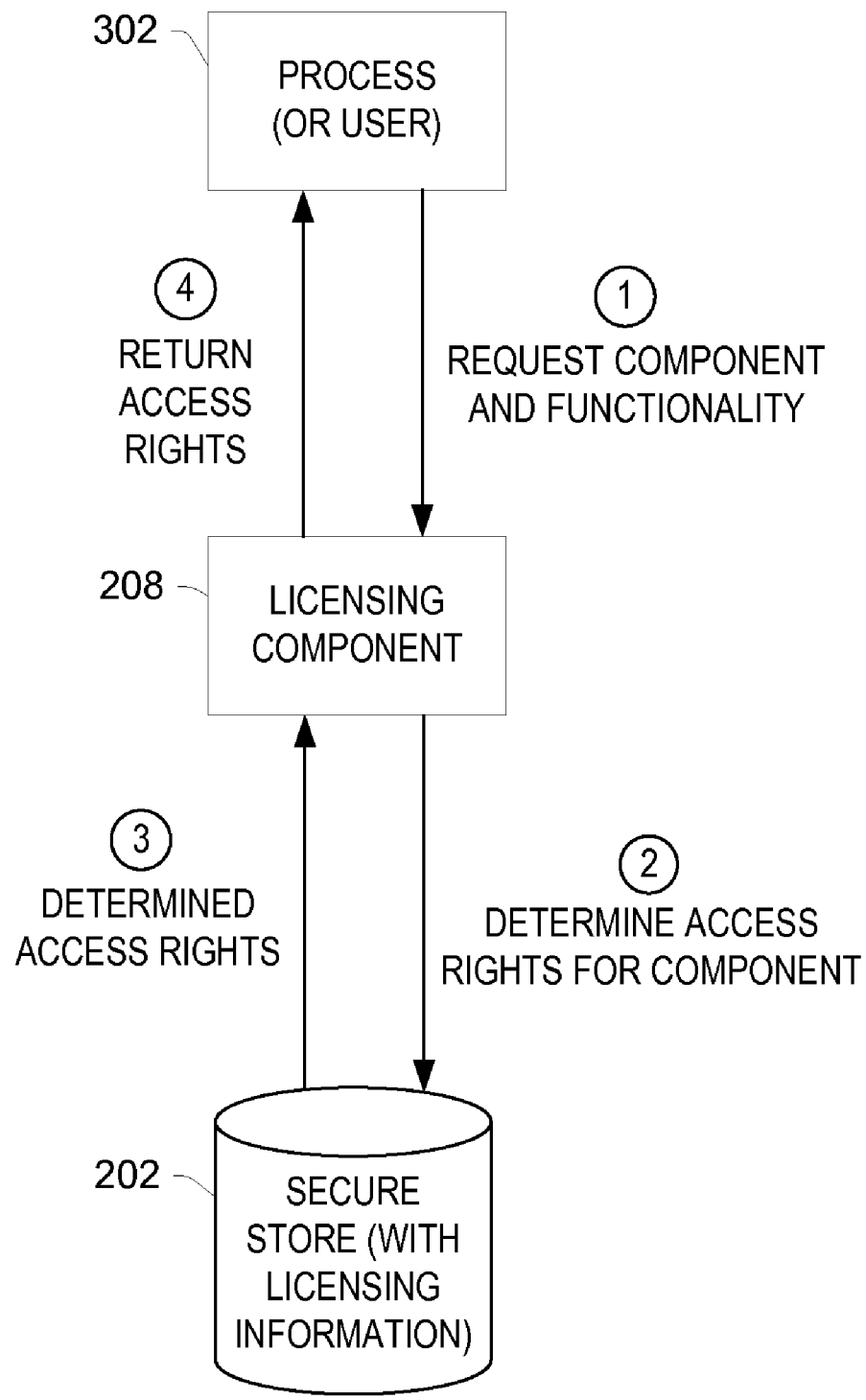
FIG. 3 is an exemplary block diagram illustrating operation of the authorization module selectively providing access to software product functionality after installation of the software product.

Referring next to FIG. 3, an exemplary block diagram illustrates operation of the authorization module to selectively provide access to software product functionality after installation of the software product. One embodiment includes the sequence of operations indicated by the circled numbers in FIG. 3. One or more computer-readable media have computer-executable instructions for performing the method illustrated in FIG. 3.

The authorization module (e.g., the licensing component) receives a request from a process or from a user 302 for access to a feature, the component, or functionality within the component. The received request includes, but is not limited to, a component identifier, function identifier, component name, and any number of arguments. In one example, the process or the user 302 are provided with a function call such as is_function_available( ). In another example, the invention software intercepts application programming interface (API) calls to a library such as a dynamic-link library (DLL). In this example, the invention software is associated with the operating system to intercept the DLL loads and validate the DLL load or a specific function within the DLL based on the licensing information. The received request for functionality or the intercepted API function call includes, but is not limited to, at least one of a component identifier, a function identifier, a component name, and an argument.

In response to the intercepted API call or received request, the licensing component 208 consults the product definition (e.g., licensing information) stored in the secure store 202 and determines access rights for the component. The access rights specify whether or not the component is authorized to execute or to provide some other level of intermediate functionality. In one embodiment, the licensing component 208 searches a secure storage area such as secure store 202 storing the licensing rules (e.g., numerical values) from the product definition. The search is performed based on the requested component and/or the requested functionality. In an embodiment in which the received authorization information is digitally signed, the licensing component 208 validates the signed authorization information. The licensing component 208 retrieves the value in storage associated with the requested component as the access rights. In one embodiment, the licensing component 208 sends the access rights (e.g., the numerical value) to the requesting entity for further processing. The licensing component 208 or the process 302 requesting the functionality analyzes the access rights to determine whether or not to allow the component to provide the requested functionality. If the functionality is authorized, the associated component or process provides the functionality (e.g., the intercepted function call accesses the component). If the functionality is not authorized, the requesting entity is presented with an error message.

In one example, the user requests functionality from an installed component (e.g., to start a web service). The installed component checks with the licensing component 208 to determine if the stored product definition authorizes execution of the functionality. The installed component either provides the requested functionality or returns an error message based on the determination from the licensing component 208. If the functionality is not authorized, the licensing component 208 presents the user with an offer (e.g., an upgrade) to purchase the requested functionality as next described.

Purchase Opportunity

Figure 4:
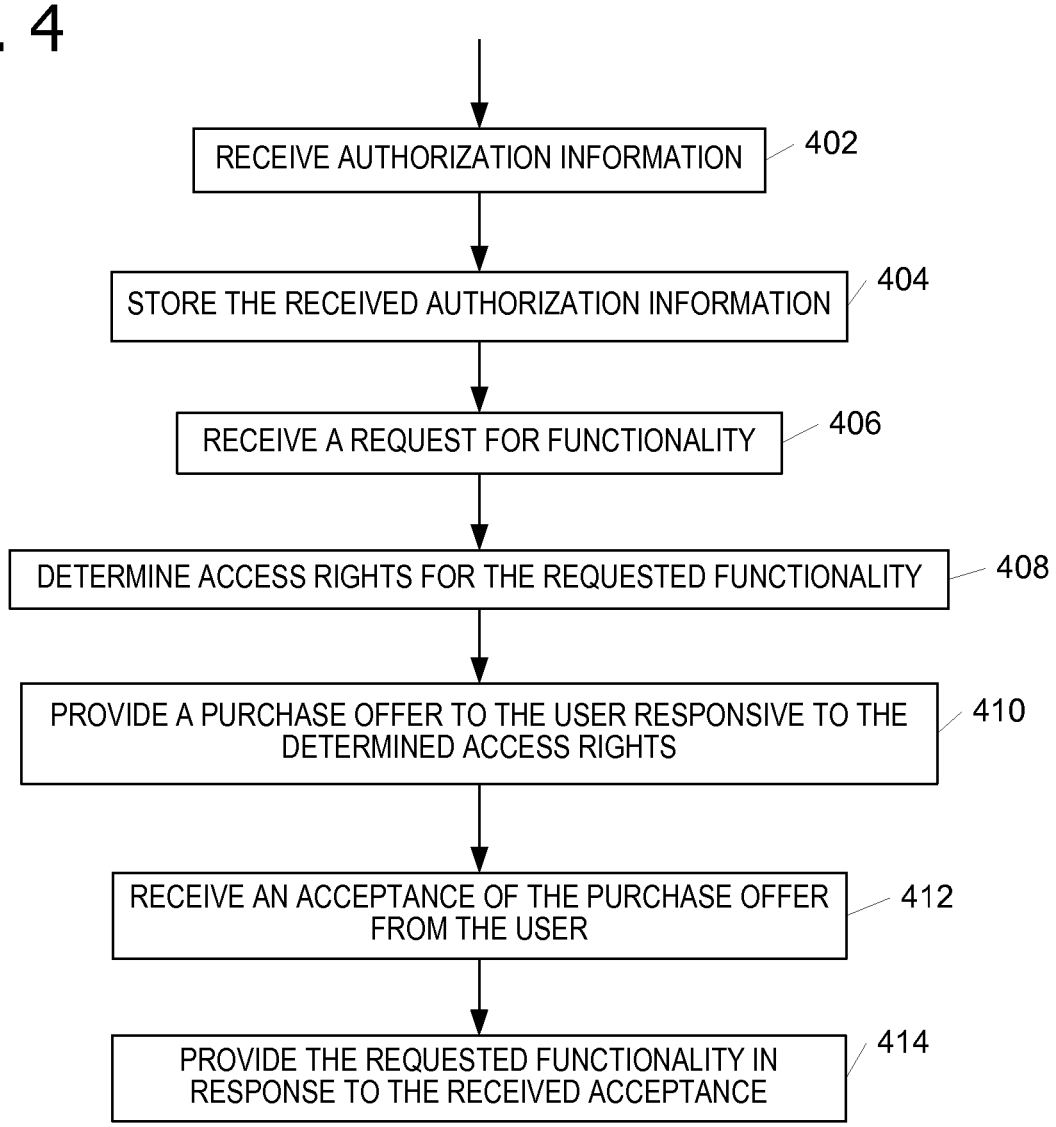
FIG. 4 is a flow chart illustrating the authorization module providing the user with an opportunity to purchase additional functionality.

Referring next to FIG. 4, a flow chart illustrates the authorization module (e.g., the licensing component) providing the user with an opportunity to purchase additional functionality. The licensing component receives authorization information associated with the software product at 402, stores the received information in memory accessible to the licensing component at 404, and receives a request for functionality associated with the component during execution of the software product at 406. The licensing component determines access rights for the requested functionality based on the received authorization information at 408. If the determined access rights deny access to the requested functionality, the licensing component provides a purchase offer to the user at 410. For example, the licensing component directs the user to a network address of an electronic commerce web site adapted to selling the requested functionality. If the licensing component receives an acceptance from the user of the provided purchase opportunity at 412, the licensing component provides or otherwise enables the requested functionality at 414. Additionally, the licensing component receives updated authorization information (e.g., an updated product definition) in response to the received acceptance and stores the received, updated authorization information on a computer-readable medium (e.g., in the secure store) accessible by the licensing component. If the purchase offer is not accepted, access to the requested functionality is denied.

In one embodiment, the licensing component interacts with the user in a secure manner so that user rights are elevated only with the permission of the user. For example, any known public/private key encryption technique or other digital rights management solution may provide security for the interaction.

One or more computer-readable media have computer-executable instructions for performing the method illustrated in FIG. 4.

Licensing Information

The licensing information or rules are explicitly defined (e.g., during operating system creation) but may be securely modified (e.g., at install time responsive to a product or license key or some other input code). As described herein, the licensing information may be secured using a secure storage area or by signing the definition file and validating the signature dynamically at process load time (e.g., when the functionality is requested). The licensing information includes any form of resource rules such as licensing criteria and upgrade availability. For example, the licensing information may authorize access or deny access to all functionality within a particular component.

Figure 5:
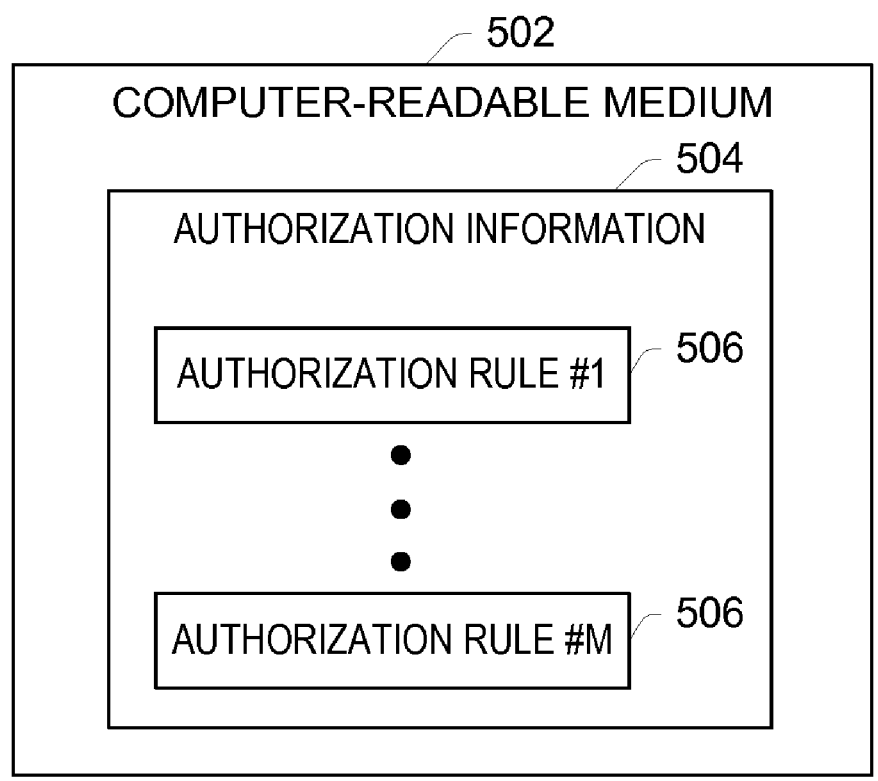
FIG. 5 is an exemplary block diagram of authorization information according to the invention.

Referring next to FIG. 5, an exemplary block diagram illustrates a data structure storing authorization information (e.g., licensing information) according to the invention. A computer-readable medium 502 accessible by the licensing component stores authorization information 504 in at least two of the data structures. Each of the data structures represents an authorization rule 506 or other authorization information such authorization rule #1 through authorization rule #M. Each authorization rule 506 provides access to functionality within the software product after installation of the software product on a computing device. In an example, a first authorization rule provides access to first functionality within the software product. A second authorization rule provides access to second functionality within the software product. The second functionality differs from the first functionality.

In one embodiment, the authorization rules 506 identify at least one of the following: the components available to a process executing on the computing device, functionality within the components available to a process executing on the computing device, the components unavailable to a process executing on the computing device, and functionality within the components unavailable to a process executing on the computing device.

Example licensing information is shown below.

```
<authorized>
    <all>
        html.dll
        networking.dll
    </all>
    <function_specific>
        user_connections.dll
        <functions>
            connect_single_user
        </functions>
    </function_specific>
<authorized>
```

In this example, any process in the operating system has access to any function contained in the html and networking DLLs. For user_connections.dll, only the connect_single_user function may be accessed. In another example, the authorization rules 506 explicitly deny access to certain functions from certain libraries. In another embodiment, the authorization rules 506 leverage other higher-level mechanisms in the operating system to describe files (e.g., the DLLs in the previous example).

In the following example, files available to the operating system are all described to be members of a component.

```
<authorized>
    <all>
        Internet_Browser_2.1
        TCP_IP_Networking
    </all>
    <functionality_specific>
        Terminal_Services
        <functionality>
            single_user_connection
        </functionality>
    </functionality_specific>
<authorized>
```

In this example, any process in the operating system has access to any function contained in the Internet_Browser_2.1 and TCP_IP_Networking components. The components may contain multiple libraries and multiple functions exported from each of the libraries. For the Terminal_Services component, only the single_user_connection functionality may be accessed. This functionality is definable by a declarative manifest associated with the component to include specific libraries and functions within the libraries available for use.

To allow additional functionality, the licensing component prompts the user to purchase the additional functionality such as by directing the user to a web site (see FIG. 4). In the example above, the user may desire the ability to connect multiple users to the terminal server. The licensing definition is updated as a result of the purchase without needing to modify or distribute different binary files. The updated licensing definition in this example is shown below.

```
<authorized>
    <all>
        Internet_Browser_2.1
        TCP_IP_Networking
    </all>
    <functionality_specific>
        Terminal_Services
        <functionality>
            single_user_connection
            multiple_user_connection
        </functionality>
    </functionality_specific>
<authorized>
```

Exemplary Operating Environment

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 4 to enable functionality within the software product after installation of the software product on a computing device.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A computer-readable storage medium having stored thereon at least two data structures each representing an authorization rule, said authorization rules each providing access to functionality within a software product after installation of the software product on a computing device, said software product including a plurality of components, said computer-readable storage medium comprising:

a manifest;

a first authorization rule providing access to a first functionality within the software product based on access rights associated with the software product, the first functionality associated with a first one or more of the components of the software, the first functionality being defined by the manifest specifying libraries and functions within libraries of the first one or more components, said first authorization rule enabling and executing the first functionality based on the access rights and the manifest; and a second authorization rule providing access to a second functionality within the software product based on the access rights associated with the software product, said second functionality differing from said first functionality, the second functionality associated with a second one or more of the components of the software, the second functionality being defined by the manifest specifying libraries and functions within libraries of the second one or more components, said second authorization rule enabling and executing the second functionality based on the access rights and the manifest.

2. The computer-readable storage medium of claim 1, wherein the first authorization rule identifies at least one of the following: the components available to a process executing on the computing device, functionality within the components available to a process executing on the computing device, the components unavailable to a process executing on the computing device, and functionality within the components unavailable to a process executing on the computing device.

3. The computer-readable storage medium of claim 1, wherein the software product comprises one or more components, and wherein the second authorization rule identifies at least one of the following: the components available to a process executing on the computing device, functionality within the components available to a process executing on the computing device, the components unavailable to a process executing on the computing device, and functionality within the components unavailable to a process executing on the computing device.

4. The computer-readable storage medium of claim 1, wherein the first authorization rule provides access to all functionality within the software product based on the access rights associated with the software product and based on the manifest.

5. The computer-readable storage medium of claim 1, wherein the first authorization rule or the second authorization rule denies access to access to a requested functionality within the software product based on the access rights associated with the software product.

6. A computer-readable storage medium having stored thereon at least two data structures each representing an authorization rule, said authorization rules each providing access to functionality within a software product after installation of the software product on a computing device, said software product including a plurality of components, said computer-readable storage medium comprising a manifest;
   a first authorization rule providing access to a first functionality within the software product based on access rights associated with the software product, the first functionality associated with a first one or more of the components of the software, said first authorization rule enabling and executing the first functionality based on the access rights and the manifest specifying libraries and functions within libraries of the first one or more components; and
   a second authorization rule providing access to a second functionality within the software product based on the access rights associated with the software product, said second functionality differing from said first functionality, the second functionality associated with a second one or more of the components of the software, said second authorization rule enabling and executing the second functionality based on the access rights and the manifest specifying libraries and functions within libraries of the second one or more components wherein in response to the first authorization rule and the second authorization rule denying access to a requested functionality based on access rights, a purchase offer is provided to a user to enable the requested functionality.

7. The computer-readable storage medium of claim 6, wherein the purchase offer to the user directs the user to a network address of an electronic commerce web site.

8. The computer-readable storage medium of claim 6, wherein an acceptance of the purchase offer is received from the user and the requested functionality is provided responsive to the received acceptance.

9. The computer-readable storage medium of claim 8, wherein the first authorization rule or the second authorization rule is updated to provide access to the requested functionality responsive to the received acceptance.

10. The computer-readable storage medium of claim 1, wherein the first authorization rule providing access to first functionality within the software product comprises a first authorization rule providing access to first functionality associated with at least one of an operating system and an application program.

11. The computer-readable storage medium of claim 1, wherein the software product is fully installed on a computing device.

12. The computer-readable storage medium of claim 1, wherein the access rights comprise licensing information.

13. The computer-readable storage medium of claim 1, wherein the software product comprises a dynamic-link library.

14. The computer-readable storage medium of claim 1, wherein the software product comprises a first component and a second component, and wherein the second component represents a different version of the first component.

15. A computer-readable storage medium comprising:
   a manifest;
   a first data structure containing authorization information associated with an software product including a plurality of components, said authorization information defining access rights;
   a second data structure representing a first authorization rule for providing access to a first functionality within the software product after installation of the software product on a computing device based on the access rights associated with the software product, the first functionality associated with a first one or more of the installed components of the installed software, the first functionality being defined by a manifest specifying libraries and functions within libraries of the first one or more installed components, said first authorization rule enabling and executing the first functionality based on the access rights and the manifest;
   a third data structure representing a second authorization rule for providing access to a second functionality within the software product after installation of the software product on the computing device based on the access rights associated with the software product, said second functionality differing from said first functionality, the second functionality associated with a second one or more of the installed components of the installed software, the second functionality being defined by the manifest specifying libraries and functions within libraries of the second one or more installed components, said second authorization rule enabling and executing the second functionality based on the access rights and the manifest.

16. The computer-readable storage medium of claim 15, wherein the authorization information comprise licensing information associated with the software product.

17. The computer-readable storage medium of claim 15, wherein a request for functionality is received during execution of the software product; and
   wherein the requested functionality is provided in accordance to access rights determined from the manifest and one of the second data structure and the third data structure.

18. The computer-readable storage medium of claim 17, wherein when the requested functionality is denied in accor dance to access rights, a purchase offer is provided to a user to enable the requested functionality.

19. The computer-readable storage medium of claim 18, wherein an acceptance of the purchase offer is received from the user and the requested functionality is provided responsive to the received acceptance.

20. The computer-readable storage medium of claim 19, wherein the first authorization rule or the second authorization rule is updated to provide access to the requested functionality responsive to the received acceptance.

* * * * *